United States Patent
Peckover et al.

(10) Patent No.: US 8,001,047 B2
(45) Date of Patent: Aug. 16, 2011

(54) METHOD AND APPARATUS FOR EFFECTING PAYMENT

(75) Inventors: Douglas L. Peckover, Dallas, TX (US);
Benjamin L. Wright, Dallas, TX (US)

(73) Assignee: Paradox Technical Solutions LLC, Wilmington, DE (US)

( * ) Notice: Subject to any disclaimer, the term of this patent is extended or adjusted under 35 U.S.C. 154(b) by 606 days.

(21) Appl. No.: 11/153,224

(22) Filed: Jun. 15, 2005
(Under 37 CFR 1.47)

(65) Prior Publication Data
US 2006/0026098 A1 Feb. 2, 2006

Related U.S. Application Data

(60) Provisional application No. 60/581,246, filed on Jun. 18, 2004.

(51) Int. Cl.
*G06Q 40/00* (2006.01)
(52) U.S. Cl. .............................. 705/41; 705/35
(58) Field of Classification Search .................. 705/41, 705/35
See application file for complete search history.

(56) References Cited

U.S. PATENT DOCUMENTS

| | | | | |
|---|---|---|---|---|
| 5,068,894 A * | 11/1991 | Hoppe | | 713/172 |
| 5,649,118 A * | 7/1997 | Carlisle et al. | | 705/41 |
| 5,710,889 A | 1/1998 | Clark et al. | | |
| 5,873,072 A | 2/1999 | Kight et al. | | |
| 5,956,521 A | 9/1999 | Wang | | |
| 6,192,380 B1 | 2/2001 | Light et al. | | |
| 6,609,654 B1 * | 8/2003 | Anderson et al. | | 235/379 |
| 6,970,852 B1 | 11/2005 | Sendo et al. | | |
| 6,980,969 B1 | 12/2005 | Tuchler et al. | | |
| 6,983,882 B2 * | 1/2006 | Cassone | | 235/382 |
| 7,039,440 B2 * | 5/2006 | Rodriguez et al. | | 455/558 |
| 7,136,835 B1 | 11/2006 | Flitcroft et al. | | |
| 7,242,921 B2 | 7/2007 | Sullivan et al. | | |
| 7,246,235 B2 | 7/2007 | Ellison et al. | | |
| 7,263,607 B2 | 8/2007 | Ingerman et al. | | |
| 7,412,422 B2 | 8/2008 | Shiloh | | |
| 7,461,397 B2 | 12/2008 | Karamchedu et al. | | |
| 2001/0011250 A1 | 8/2001 | Paltenghe et al. | | |
| 2001/0029485 A1 * | 10/2001 | Brody et al. | | 705/39 |
| 2001/0029496 A1 | 10/2001 | Otto et al. | | |
| 2001/0032192 A1 | 10/2001 | Putta et al. | | |
| 2001/0039535 A1 | 11/2001 | Tsiounis et al. | | |
| 2001/0044787 A1 | 11/2001 | Shwartz et al. | | |
| 2002/0120559 A1 | 8/2002 | O'Mara | | |
| 2003/0028481 A1 * | 2/2003 | Flitcroft et al. | | 705/39 |
| 2003/0204619 A1 | 10/2003 | Bays | | |
| 2004/0049478 A1 | 3/2004 | Jasper et al. | | |

(Continued)

FOREIGN PATENT DOCUMENTS

WO 9949424 9/1999

(Continued)

OTHER PUBLICATIONS

Make Way for the Smart Cards. (Mar. 2003). Topics Magazine. Retrieved Apr. 7, 2011.*

(Continued)

*Primary Examiner* — Narayanswamy Subramanian
*Assistant Examiner* — Kito R Robinson

(57) ABSTRACT

One aspect of the invention relates to a technique for effecting payment, and involves: presenting a portable device; and causing the portable device to output a pseudo payment code.

36 Claims, 1 Drawing Sheet

U.S. PATENT DOCUMENTS

| | | | | |
|---|---|---|---|---|
| 2004/0111751 | A1* | 6/2004 | Tsuria | 725/104 |
| 2004/0236819 | A1* | 11/2004 | Anati et al. | 709/200 |
| 2005/0125343 | A1* | 6/2005 | Mendelovich | 705/39 |
| 2007/0005762 | A1 | 1/2007 | Knox et al. | |
| 2008/0306835 | A1 | 12/2008 | Agura et al. | |

FOREIGN PATENT DOCUMENTS

WO      WO 9966428 A1 * 12/1999

OTHER PUBLICATIONS

U.S. Appl. No. 10/965,700, entitled "Method and Apparatus Facilitating Electronic Transactions", by Peckover, et al., filed Oct. 14, 2004.
Non-Final Rejection; U.S. Appl. No. 10/965,700; Mailed Mar. 18, 2008.
Response to Non-Final Rejection; U.S. Appl. No. 10/965,700, filed May 16, 2008.
Final Rejection; U.S. Appl. No. 10/965,700; Mailed Aug. 22, 2008.
U.S. Appl. No. 10/966,361, filed Oct. 15, 2004.
U.S. Appl. No. 10/967,019, filed Oct. 15, 2004.
Restriction Requirement; U.S. Appl. No. 10/967,019; Mailed Mar. 18, 2008.
Response to Restriction Requirement; U.S. Appl. No. 10/967,019, filed May 16, 2008.
Non-Final Rejection; U.S. Appl. No. 10/967,019; Mailed Jul. 31, 2008.
U.S. Appl. No. 10/967,021, filed Oct. 15, 2004.
U.S. Appl. No. 60/581,246, filed Jun. 18, 2004.
Official Action in U.S. Appl. No. 10/965,700, filed Jan. 28, 2009.
Response to Official Action in U.S. Appl. No. 10/965,700, filed Jan. 28, 2009, mailed Apr. 28, 2009.
Official Action in U.S. Appl. No. 10/965,700, filed Aug. 18, 2009.
Official Action in U.S. Appl. No. 10/966,361, filed Apr. 1, 2009.
Response to Official Action in U.S. Appl. No. 10/966,361, filed Apr. 1, 2009, mailed Jul. 31, 2009.
Official Action in U.S. Appl. No. 10/966,361, filed Nov. 25, 2009.
Response to Official Action in U.S. Appl. No. 10/966,361, filed Nov. 25, 2009, mailed Jan. 25, 2009.
Official Action in U.S. Appl. No. 10/967,021, filed Dec. 12, 2008.
Response to Official Action in U.S. Appl. No. 10/967,021, filed Dec. 12, 2008, mailed Mar. 11, 2009.
Notice of Allowability in U.S. Appl. No. 10/967,021, filed Jul. 15, 2009.
Peter Wayner's article "A Tool for Anonymity on the Internet", The New York Times, Dec. 16, 1999, p. G.17.
Official Action in U.S. Appl. No. 10/966,361 issued Apr. 28, 2011, 15 pages.

* cited by examiner

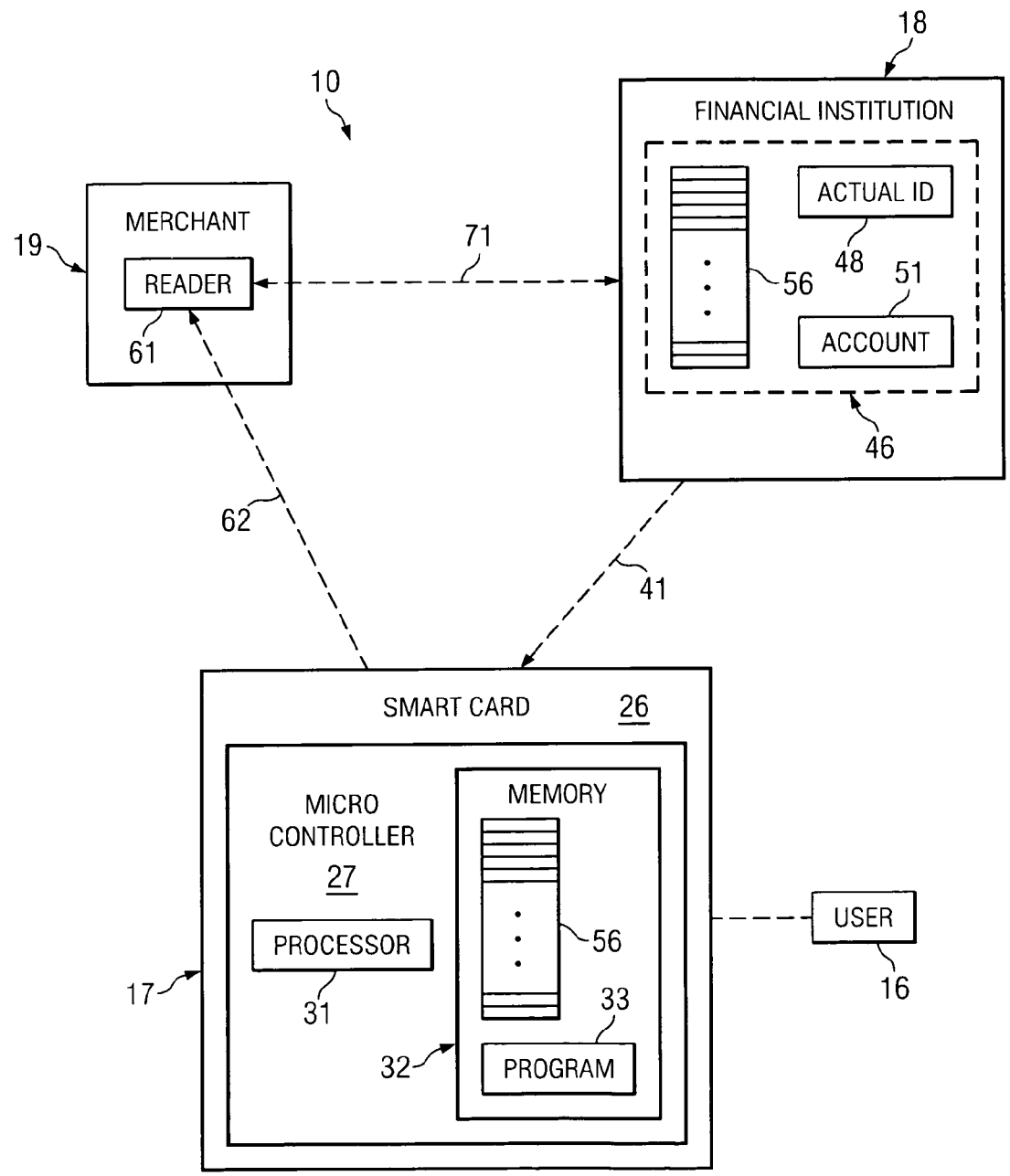

METHOD AND APPARATUS FOR EFFECTING PAYMENT

This application claims the benefit of provisional application No. 60/581,246, filed Jun. 18, 2004.

FIELD OF THE INVENTION

This invention relates in general to techniques for effecting payment and, more particularly, to techniques for effecting payment without revealing the actual identity of a person making the payment.

BACKGROUND

It has become very common for merchants to provide products with identifiers that can be scanned or read automatically. For example, almost all products now have barcodes that can be scanned at a point-of-sale terminal. A new approach involves using small devices known as radio frequency identification (RFID) tags. The RFID tags are attached to products in lieu of (or in addition to) barcodes. An RFID tag emits radio signals that contain selected information, such as a number identifying a product to which the tag is currently attached.

These types of technologies permit a cashier at a point-of-sale terminal to rapidly and accurately identify each product that is being purchased by a customer, and to rapidly determine the total payment owed by the customer. Further, the scanned information can be used by the merchant's computer to automatically and efficiently track and maintain inventory.

However, it is also becoming very common for merchants to use this scanned information to track buying habits of individual consumers. For example, if a consumer always pays the merchant with a particular credit card, or with a check from a particular checking account, the merchant's computer can compile a buying history associated with that particular credit card number or checking account number. There are commercially-available Customer Relationship Manager (CRM) software programs that are designed specifically to collect and analyze this type of customer information. The compiled information is valuable to the merchant, but it also raises significant questions in relation to the privacy rights of the consumers. Consequently, there is a need for techniques that allow a person to effect a payment without revealing his or her actual identity.

SUMMARY OF THE INVENTION

One of the broader forms of the invention relates to a technique for effecting payment, and involves: presenting a portable device; and causing the portable device to output a pseudo payment code.

BRIEF DESCRIPTION OF THE DRAWINGS

A better understanding of the present invention will be realized from the detailed description that follows, taken in conjunction with the accompanying drawing FIGURE, which is a block diagram showing an arrangement that embodies aspects of a method and apparatus according to the invention, and that includes a user, a smart card, a financial institution, and a merchant.

DETAILED DESCRIPTION

The drawing FIGURE is a block diagram showing an arrangement 10 that embodies aspects of a method and an apparatus according to the invention. The block diagram shows a user 16, a smart card 17, a financial institution 18 such as a bank, and a merchant 19.

Persons skilled in the art are familiar with smart cards. The smart card 17 is therefore described only to the extent needed to convey an understanding of the present invention. The hardware of the smart card 17 is known in the art. In the disclosed embodiment, the smart card 17 is a type of card commonly referred to as a microcontroller card with contacts. It includes a plastic card 26 that is similar in size and shape to a standard credit card. An integrated circuit is mounted on the card 26, and includes a microcontroller 27.

The microcontroller 27 includes, among other things, a processor 31 and a memory 32. The memory 32 include two or more types of memory, such as a read-only memory (ROM), a random access memory (RAM), and/or a "flash" RAM memory. The memory 32 stores a program 33 that is executed by the processor 31. The memory 32 also stores data used by the processor 31, some of which will be discussed in more detail later. The smart card 17 has several not-illustrated metal contacts that are located on or near the integrated circuit containing the microcontroller 27. An external device can use the contacts to supply operating power to the microcontroller 27, and to electrically interact with the microcontroller 27.

As indicated diagrammatically by a broken line arrow 41, the smart card 17 is issued to the user 16 by the financial institution 18, much as the financial institution 18 would issue a credit card to a user. The financial institution 18 maintains information 46 that relates to the user 16 and the smart card 17. In the disclosed embodiment, the information 46 is stored in a memory that is part of a computer system used by the financial institution 18. However, the information 46 could be maintained in some other manner.

The information 46 includes an actual identification 48 of the user 16. The actual identification 48 includes information such as the true legal name of the user 16, an address of the user 16, a social security number of the user 16, contact information such as telephone numbers, and other relevant information. The information 46 also includes an identification of an account 51 that belongs to the user 16. In the disclosed embodiment, the account 51 is a credit card account maintained for the user 16 by the financial institution 18. However, the account 51 could alternatively be some other type of account, such as a debit card account, a savings account, or a brokerage account. Further, it would alternatively be possible for the account 51 to be an account maintained by some entity other than the financial institution 18, such as a different financial institution.

When the financial institution 18 issues the smart card 17 to the user 16, the financial institution stores a table 56 in the memory 32 of the smart card 17, and also saves an identical copy of the table 56 in the information 46 that relates to the user 16. In the disclosed embodiment, each row of the table 56 includes pseudo-identifier information. For example, each row includes pseudo payment information such as a pseudo credit card number and a pseudo expiration date. Further, each row includes pseudo identity information, such as a fictitious name and a fictitious address for the user 16.

The user 16 can use the smart card 17 in commercial transactions. For example, assume that the user 16 decides to purchase a product from the merchant 19. In order to effect payment for the product, the user 16 presents the smart card 17, in the same manner that a customer would normally present a standard credit card to the merchant. The presentation of the smart card 17 is represented diagrammatically in the FIGURE by a broken line arrow 62. The smart card 17 may be configured so that it appears to be a standard credit card, and in that case the merchant 19 will believe that it is a standard credit card.

The merchant 19 inserts the smart card 17 into a reader 61 of a known type. The reader 61 has a plurality of electrical contacts that each engage a respective metal contact on the smart card 17, in order to provide operating power to the microcontroller 27, and in order to permit the reader 61 to interact with the microcontroller 27. The microcontroller 27 on the smart card 17 selects a row in the table 56, and then provides the merchant 19 with information from this row, including the pseudo credit card number and the pseudo expiration date. The merchant may also be given other information from the selected row of the table, such as pseudo identity information for the user 16.

In any case, the merchant 19 receives only pseudo information, and thus does not know the actual identity of the user 16, or any actual credit card number or account number of the user 16. Consequently, even where the product has an identifier that can be scanned, such as a bar code or a radio frequency identification (RFID) tag, it becomes difficult or impossible for the merchant 19 to link the purchased product(s) to any actual person. In the disclosed embodiment, the smart card 17 uses a different pseudo card number each time the user 16 carries out a transaction with the merchant 19. Therefore, it is difficult or impossible for the merchant 19 to track buying habits of the user 16 across multiple transactions, or to develop a meaningful collection of information about the user 16.

In order to obtain payment authorization for the purchase, the reader 61 takes the pseudo card number and the pseudo expiration date supplied by the smart card 17, and forwards this pseudo information to the financial institution 18, as indicated diagrammatically in the FIGURE by a broken line arrow 71. The financial institution 18 then compares the pseudo credit card number to the pseudo card numbers that it has previously issued to many different users, including the user 16. In this particular case, the financial institution 18 will find that the pseudo card number received from the reader 61 matches a pseudo card number in the table 56 that the financial institution saved at 46 in association with the user 16. The financial institution can thus identify the particular user 16 who is associated with the pseudo card number sent by the reader 61.

Assuming that the actual credit card account 51 of the user 16 is currently in good standing, the financial institution 18 will send authorization back to the merchant 19 at 71. The financial institution 18 will charge the amount of the transaction to the actual credit card account 51 of the user 16, but will not reveal to the merchant 19 the actual account 51 or the actual identification 48 of the user 16. The merchant 19 will then complete the transaction using the pseudo credit card number and the pseudo expiration date. The smart card 17 will then be removed from the reader 61, and the user 16 can depart the premises of the merchant 19 with the smart card 17 and the purchased product.

There are a variety of ways in which the microcontroller 27 can select one of the rows in the table 56 for a given transaction. For example, as the user 16 makes a number of successive purchase transactions over time, the microcontroller 27 can begin with the first row of the table and select successive rows for the respective transactions, until it eventually reaches the last row. The microcontroller 27 can then automatically wrap around to the first row and use the entries in the table again. Alternatively, the microcontroller 27 can stop after it reaches the last row, such that each pseudo card number is effectively a single-use card number. Where the microcontroller has stopped at the last row, it can be taken to the financial institution 18 in order to have the original table 56 replaced with a similar table that contains new pseudo information.

In an alternative approach for selecting rows from the table 56, the program 33 may cause the microcontroller 27 to select rows using a random or pseudo-random selection technique. Rows that have already been randomly selected can optionally be flagged, so that they are not selected again until all other rows have been selected at least once. As still another approach, the rows in the first half of the table 56 might be designated for use between midnight and noon, and the rows in the second half of the table 56 might be designated for use between noon and midnight. Consequently, if the microcontroller 27 was selecting a row during the afternoon, it would select a row from the second half of the table 56. When pseudo information from this row was forwarded from the reader 61 to the financial institution 18 a second or two later, the financial institution would, as part of the authentication process, verify that the pseudo information was from a row in the second half of the table 56, rather then from a row in the first half.

As still another alternative, the selection of a row from the table 56 could depend in part on the particular transaction that is currently in progress. For example, when the smart card 17 is in the reader 61 of the merchant 19, the smart card 17 can obtain information from the reader 61, such as an identifier for the merchant 19, or information about the particular product that is being purchased. The table 56 may have one or more rows that have been set aside for use only in transactions with merchant 19, and the smart card 17 would thus select one of these rows when it sees that the current transaction is with the merchant 19. Each such row could have a pseudo identifier that is configured or marked in a manner so that, when the merchant 19 is given the pseudo identifier, the merchant knows that the user 16 is a regular customer of the merchant 19, even though the merchant 19 is not given any information about the actual identity 48 or the actual account 51 of the user 16.

Although the disclosed embodiment takes the approach of providing the table 56 having a number of rows that each contain predetermined pseudo information, it would alternatively be possible to for the microcontroller to select or generate pseudo information in some other suitable manner.

The program 33 controls the manner in which pseudo identifiers are obtained, for example by selecting rows from the table 56. The manner in which this occurs can be changed from time to time. For example, the financial institution may update the program 33 in the smart card 17, possibly while the smart card 17 is in the reader 61 at a merchant. Alternatively, the financial institution 18 can issue a replacement smart card having an updated program. For example, if the program 33 was initially configured to recognize the particular merchant 19 and to take special action, the program 33 could be updated in a manner so that it no longer treats the merchant 19 differently from any other merchant, and takes no special action for the merchant 19. The program 33 could also have the capability to automatically change the manner in which it operates. For example, the program 33 may initially be configured to permit any type of purchase. However, if the program 33 determines that the user has made purchases within a specified time period that total more than a selected credit limit, the program 33 could automatically change its operation to refuse to select a row from the table 56 for any single transaction that has a value in excess of a specified limit.

Although one selected embodiment has been illustrated and described in detail, it should be understood that a variety of substitutions and alterations are possible without departing from the spirit and scope of the present invention, as defined by the following claims.

What is claimed is:

1. A smart card, comprising:
a processor;
memory coupled to the processor, wherein the memory is configured to store a plurality of entries, at least two of which include pseudo payment information for a user's account with a financial institution;
wherein the smart card is configured to perform, in response to receiving a stimulus from a card reader during a commercial transaction, operations comprising:
receiving information about the commercial transaction;
selecting one, but not all, of the at least two entries of the plurality of entries, wherein the entry is selected, by the processor, based on the received information about the commercial transaction; and
outputting the pseudo payment information included in the selected one entry by providing the included pseudo payment information to the card reader without outputting other pseudo payment information included in non-selected entries;
wherein the pseudo payment information output by the smart card is usable by an entity to facilitate the entity to receive payment for the commercial transaction without allowing the entity to identify the user or the account; and
wherein the smart card is configured to select a different entry of the at least two entries and to provide pseudo payment information included in the selected different entry in response to receiving a stimulus corresponding to a different commercial transaction.

2. The smart card of claim 1,
wherein the pseudo payment information included in the plurality of entries correspond to a single credit card or a single debit card, issued by the financial institution to the user; and
wherein said selecting one of the at least two entries is based on information about the commercial transaction other than an amount of the commercial transaction.

3. The smart card of claim 1, wherein one or more of the plurality of entries comprises a pseudo card number and a pseudo expiration date.

4. The smart card of claim 1, wherein one or more of the plurality of entries comprises fictitious identity information for the user.

5. The smart card of claim 1, wherein the smart card is configured to provide pseudo payment information from different ones of the plurality of entries during separate commercial transactions based at least in part on the separate commercial transactions respectively being with various different entities, wherein the pseudo payment information from each provided entry is usable at the financial institution to receive payment therefrom without revealing actual identity information of the user or actual identification information of the account to the various different entities.

6. The smart card of claim 1, wherein the smart card includes one or more contacts, and wherein the stimulus includes direct, physical contact between the one or more contacts and the card reader, and wherein the pseudo payment information included in at least one of the plurality of entries corresponds to a credit or debit card issued by the financial institution to the user.

7. The smart card of claim 1, wherein the stimulus received from the card reader causes power to be supplied to the smart card, and wherein the pseudo payment information is usable by the entity to receive payment from the financial institution.

8. The smart card of claim 1, wherein the pseudo payment information output by the smart card is usable by the entity to facilitate receiving payment for the commercial transaction without revealing at least one of the legal name of the user; an actual address of the user; the social security number of the user; or contact information of the user.

9. The smart card of claim 1, wherein the pseudo payment information output by the smart card is usable by the entity to facilitate receiving payment for the commercial transaction without revealing an account number or a card expiration date associated with the account.

10. The smart card of claim 1, wherein the smart card is configured to perform the selecting the one of the at least two entries based at least in part on randomly or pseudo-randomly selecting entries from the plurality of entries.

11. The smart card of claim 10, wherein the selecting the one of the at least two entries includes selecting from entries not previously selected until all entries have been selected at least once.

12. The smart card of claim 1, wherein the smart card is configured to perform the selecting the one of the at least two entries based at least in part on received information about a time of day of the commercial transaction.

13. The smart card of claim 12, wherein different groups of the plurality of entries are available for selection by the processor for output at respective portions of the day.

14. The smart card of claim 1, wherein the smart card is configured to perform the selecting the one of the at least two entries based at least in part on received information about a product that is part of the commercial transaction.

15. A method, comprising:
in response to a stimulus received from a card reader during a first commercial transaction, a smart card:
receiving, from the card reader, information about the first commercial transaction;
selecting a first pseudo payment entry from a plurality of pseudo payment entries stored in a memory of the smart card, wherein the first pseudo payment entry is selected based on the received information about the first commercial transaction, and wherein the plurality of pseudo payment entries includes the first pseudo payment entry and one or more non-selected pseudo payment entries; and
providing the selected first pseudo payment entry by outputting the selected first pseudo payment entry to the card reader without outputting the non-selected pseudo payment entries, wherein the selected first pseudo payment entry is usable by an entity to facilitate receiving payment, from a user's account with a financial institution, for the first commercial transaction without allowing the entity to identify the user or the account; and
in response to a subsequent stimulus during a second commercial transaction, the smart card:
selecting a second pseudo payment entry from the plurality of pseudo payment entries, wherein the second pseudo payment entry is selected based on information about the second commercial transaction; and
providing the selected second pseudo payment entry by outputting the selected second pseudo payment entry without outputting pseudo payment entries other than the selected second pseudo payment entry, wherein the second pseudo payment entry is different from the first pseudo payment entry and is usable to facilitate receiving payment for the second commercial transaction.

16. The method of claim 15, wherein the subsequent stimulus is received by the smart card from the card reader during the second commercial transaction.

17. The method of claim 15, further comprising:
in response to determining that a third commercial transaction is with the entity, providing the first pseudo payment entry as output from the smart card to facilitate receipt of payment by the entity for the third commercial transaction.

18. The method of claim 15, wherein the subsequent stimulus is received by the smart card from a different card reader during the second commercial transaction.

19. The method of claim 15, wherein said selecting the first pseudo payment entry is further based at least in part on a random or pseudo-random technique.

20. The method of claim 19, wherein said selecting includes providing entries of the plurality of the pseudo payment entries not previously provided until all entries have been provided at least once.

21. The method of claim 15, wherein said selecting first pseudo payment entry is based at least in part on information about a time of day of the first commercial transaction.

22. The method of claim 21, wherein different groups of the plurality of pseudo payment entries are available for being provided by the smart card during different portions of the day.

23. The method of claim 15, wherein said selecting the first pseudo payment entry is based at least in part on received information about an identity associated with the card reader.

24. The method of claim 15, wherein said selecting the first pseudo payment entry is based at least in part on received information about a product that is part of the first commercial transaction.

25. The method of claim 15, further comprising updating the smart card from using a first technique for providing entries from the plurality of pseudo payment entries to using a second technique for providing entries from the plurality of pseudo payment entries.

26. A method, comprising:
storing a plurality of payment entries on a smart card, wherein each payment entry includes pseudo payment information corresponding to a user's account with a financial institution;
storing a program on the smart card, wherein the program is executable, using the processor, to cause the smart card to:
receive information relating to details of a transaction with a merchant;
select pseudo payment information included in one, but not all, of the plurality of payment entries, wherein pseudo payment information is selected based on the received information;
provide the selected pseudo payment information by outputting the selected pseudo payment information to a card reader without outputting pseudo payment information other than the selected pseudo payment information, wherein the provided pseudo payment information facilitates the merchant receiving payment for the transaction without providing information to the merchant that is usable by the merchant to identify the user or the account;
during subsequent transactions, select different pseudo payment information from different entries of the plurality of payment entries, wherein selecting different pseudo payment information is based at least in part on information relating to details of the subsequent transactions; and
provide the selected different pseudo payment information by outputting the selected different pseudo payment information to the card reader or one or more other card readers without outputting pseudo payment information other than the selected different pseudo payment information.

27. The method of claim 26, wherein the program is updatable.

28. The method of claim 26, wherein the program is executable to cause the smart card to select the pseudo payment information based at least in part on received information relating to a time of day of the transaction.

29. The method of claim 26, wherein the program is executable to cause the smart card to select the pseudo payment information based at least in part on received information relating to a product that is part of the transaction.

30. A smart card comprising:
a processor; and
a tangible computer-readable medium having stored thereon, computer-executable instructions that in response to execution by the smart card, using the processor, cause the smart card to:
select, in response to receiving a stimulus during a commercial transaction, one but not all of a plurality of pseudo payment entries stored on the smart card, wherein said selecting is based at least in part on information relating to details of the commercial transaction, wherein the selected pseudo payment entry includes information corresponding to a user account with a financial institution;
provide the selected pseudo payment entry by outputting the selected pseudo payment entry to a device reader without outputting non-selected pseudo payment entries during the commercial transaction, wherein the provided pseudo payment entry is usable by an entity to provide to the financial institution to receive payment for the commercial transaction without revealing to the entity actual identity information of the user account;
select a different pseudo payment entry of the plurality of pseudo payment entries based at least in part on information relating to details of a different commercial transaction;
provide the selected different pseudo payment entry by outputting the selected different pseudo payment entry without outputting other pseudo payment entries during the different commercial transaction.

31. The smart card of claim 30, wherein the instructions are executable to cause the smart card to select one of the plurality of pseudo payment entries based at least in part on information relating to a time of the commercial transaction.

32. The smart card of claim 30, wherein the instructions are executable to cause the smart card to select one of the plurality of pseudo payment entries based at least in part on information relating to a product that is part of the commercial transaction.

33. The smart card of claim 30, wherein the program instructions are updatable to implement different techniques for selecting pseudo payment entries.

34. A portable device, comprising:
a processor;
a memory coupled to the processor, wherein the memory stores program instructions executable by the portable device, using the processor, to cause the portable device to:
   select, in response to receiving a stimulus from a card reader during a first commercial transaction, one but not all of a plurality of payment entries from the portable device, wherein said selecting is based at least in part on information that includes details of the first commercial transaction, wherein the plurality of payment entries respectively comprise pseudo payment information corresponding to a user account;
   output first pseudo payment information included in the selected payment entry by providing the first pseudo payment information without providing other pseudo payment information included in non-selected ones of the plurality of payment entries, wherein the first pseudo payment information is usable by a merchant to receive payment for the first commercial transaction without the merchant receiving actual identification information for the user account; and
   select a different payment entry of the plurality of pseudo payment entries based at least in part on information that includes details of a second commercial transaction; and
   output second pseudo payment information included in the selected different payment entry by providing the second pseudo payment entry without providing other pseudo payment information.

35. A portable device, comprising:
first means for storing a plurality of entries that include pseudo payment information for a user's account with a financial institution; and
second means for:
   selecting one, but not all, of the plurality of entries in response to receiving a stimulus from a card reader during a first commercial transaction, wherein the selecting is based at least in part on information relating to the first commercial transaction;
   outputting the pseudo payment information included in the selected one of the plurality of entries by providing the included pseudo payment information without providing other pseudo payment information included in non-selected entries of the plurality of entries, wherein the output pseudo payment information is usable by an entity to facilitate receiving payment for the first commercial transaction without identifying the user or the account to the entity;
   selecting a different payment entry of the plurality of pseudo payment entries based at least in part on information that includes details of a second commercial transaction; and
   outputting second pseudo payment information included in the selected different payment entry by providing the second pseudo payment entry without providing other pseudo payment information.

36. A smart card, comprising:
memory storing a plurality of entries that each include pseudo payment information for a user's account with a financial institution;
wherein the smart card is configured to:
   select, in response to receiving a stimulus from a card reader and receiving information relating to a commercial transaction, one but not all of the plurality of entries; and
   output the included pseudo payment information of the selected entry of the plurality of entries by providing the included pseudo payment information to the card reader without providing other pseudo payment information included in non-selected other entries of the plurality of entries;
wherein the pseudo payment information output by the smart card corresponds to a single credit or debit card issued by the financial institution to the user;
wherein the single credit card or debit card is usable by an entity to facilitate the entity receiving payment for the commercial transaction without allowing the entity to identify the user or the account; and
wherein the smart card is configured to select a different entry of the plurality of entries and to output pseudo payment information included in the selected different entry in response to receiving a stimulus corresponding to a different commercial transaction.

* * * * *